United States Patent
Lin et al.

(10) Patent No.: US 12,036,941 B1
(45) Date of Patent: Jul. 16, 2024

(54) AIRBAG WITH EXTENDED HORIZONTAL CUSHION PREVENTING HEAD AND KNEE CONTACT

(71) Applicant: GM Global Technology Operations LLC, Detroit, MI (US)

(72) Inventors: Chin-Hsu Lin, Troy, MI (US); Chang Kyu Son, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/303,028

(22) Filed: Apr. 19, 2023

(51) Int. Cl.
*B60R 21/233* (2006.01)
*B60R 21/00* (2006.01)
*B60R 21/01* (2006.01)
*B60R 21/2338* (2011.01)

(52) U.S. Cl.
CPC ........ *B60R 21/233* (2013.01); *B60R 21/2338* (2013.01); *B60R 2021/0048* (2013.01); *B60R 2021/01238* (2013.01); *B60R 2021/01286* (2013.01); *B60R 2021/23308* (2013.01); *B60R 2021/23324* (2013.01); *B60R 2021/23382* (2013.01); *B60R 2021/23384* (2013.01)

(58) Field of Classification Search
CPC .. B60R 2021/0048; B60R 2021/01238; B60R 2021/01286; B60R 2021/23107; B60R 2021/23308; B60R 2021/23316; B60R 2021/23324; B60R 2021/23382; B60R 2021/23384; B60R 21/015; B60R 21/01512; B60R 21/01552; B60R 21/01554; B60R 21/205; B60R 21/231; B60R 21/233; B60R 21/2338
See application file for complete search history.

(56) References Cited

U.S. PATENT DOCUMENTS

| | | | | |
|---|---|---|---|---|
| 3,831,972 | A * | 8/1974 | Allgaier | B60R 21/233 280/730.1 |
| 6,189,928 | B1 * | 2/2001 | Sommer | B60R 21/233 280/743.1 |
| 6,315,323 | B1 * | 11/2001 | Pack, Jr. | B60R 21/233 280/743.1 |
| 6,460,878 | B2 * | 10/2002 | Eckert | B60R 21/2342 280/743.1 |
| 6,513,829 | B1 * | 2/2003 | Zumpano | B60R 21/233 280/730.1 |
| 6,616,177 | B2 * | 9/2003 | Thomas | B60R 21/233 280/736 |
| 6,616,184 | B2 * | 9/2003 | Fischer | B60R 21/233 280/743.2 |
| 6,918,614 | B2 * | 7/2005 | Ryan | B60R 21/2338 280/736 |

(Continued)

FOREIGN PATENT DOCUMENTS

JP  2007161201 A  *  6/2007  ..........  B60R 21/233

*Primary Examiner* — Laura Freedman
(74) *Attorney, Agent, or Firm* — Vivacqua Crane, PLLC

(57) ABSTRACT

An airbag system includes a vehicle having a vehicle seat rotated between an upright position to a fully reclined position. An airbag is positioned forward of a passenger seated on the vehicle seat, the airbag positioned in a stowed condition and a fully inflated condition. A horizontal cushion of the airbag in the fully inflated condition extends from a main airbag section. The horizontal cushion is contacted by a head of the passenger and prevents rotation of the head into direct contact with one or both knees of the passenger.

10 Claims, 9 Drawing Sheets

(56) References Cited

U.S. PATENT DOCUMENTS

| | | | | |
|---|---|---|---|---|
| 7,441,805 | B2 * | 10/2008 | Jamison | B60R 21/233 280/743.2 |
| 7,618,061 | B2 * | 11/2009 | Eckelberg | B60R 21/2338 280/743.1 |
| 7,784,828 | B2 * | 8/2010 | Matsu | B60R 21/233 280/739 |
| 7,862,073 | B2 * | 1/2011 | Thomas | B60R 21/2338 280/743.2 |
| 7,967,331 | B2 * | 6/2011 | Lim | B60R 21/2338 280/740 |
| 7,997,374 | B2 * | 8/2011 | Eschbach | B60R 21/01516 180/268 |
| 8,070,183 | B2 * | 12/2011 | Kumagai | B60R 21/2338 280/736 |
| 8,157,291 | B2 * | 4/2012 | Mayer | B60R 21/276 280/743.2 |
| 8,196,957 | B2 * | 6/2012 | Kubo | B60R 21/231 280/743.2 |
| 8,226,119 | B2 * | 7/2012 | Dong | B60R 21/2338 280/743.2 |
| 8,632,095 | B2 * | 1/2014 | Fischer | B60R 21/233 280/739 |
| 8,684,404 | B2 * | 4/2014 | Fischer | B60R 21/239 280/739 |
| 8,684,407 | B2 * | 4/2014 | Fischer | B60R 21/2338 280/739 |
| 9,180,832 | B2 * | 11/2015 | Le Norcy | B60R 21/2342 |
| 9,533,650 | B2 * | 1/2017 | Le Norcy | B60R 21/231 |
| 9,566,937 | B1 * | 2/2017 | Anderson | B60R 21/235 |
| 9,771,049 | B2 * | 9/2017 | Lee | B60R 21/213 |
| 9,815,428 | B2 * | 11/2017 | Anderson | B60R 21/2338 |
| 10,293,775 | B2 * | 5/2019 | Wang | B60R 21/205 |
| 10,486,635 | B2 * | 11/2019 | Karlow | B60R 21/207 |
| 10,583,799 | B2 * | 3/2020 | Schneider | B60R 21/2338 |
| 10,632,956 | B2 * | 4/2020 | Schneider | B60R 21/207 |
| 10,857,965 | B2 * | 12/2020 | Abe | B60R 21/214 |
| 11,186,249 | B2 * | 11/2021 | Kippschull | B60R 21/235 |
| 11,299,122 | B2 * | 4/2022 | Choi | B60R 21/01512 |
| 11,299,123 | B2 * | 4/2022 | Park | B60R 21/2338 |
| 11,345,305 | B2 * | 5/2022 | Fischer | B60R 21/26 |
| 11,407,373 | B2 * | 8/2022 | Kanegae | B60R 21/2338 |
| 11,752,970 | B1 * | 9/2023 | Lin | B60R 21/233 280/729 |
| 11,807,184 | B2 * | 11/2023 | Ugarte Alba | B60R 21/239 |
| 11,814,006 | B2 * | 11/2023 | Lee | B60R 21/205 |
| 11,820,318 | B2 * | 11/2023 | Kim | B60R 21/01512 |
| 2023/0026681 | A1 * | 1/2023 | Fischer | B60R 21/214 |

* cited by examiner

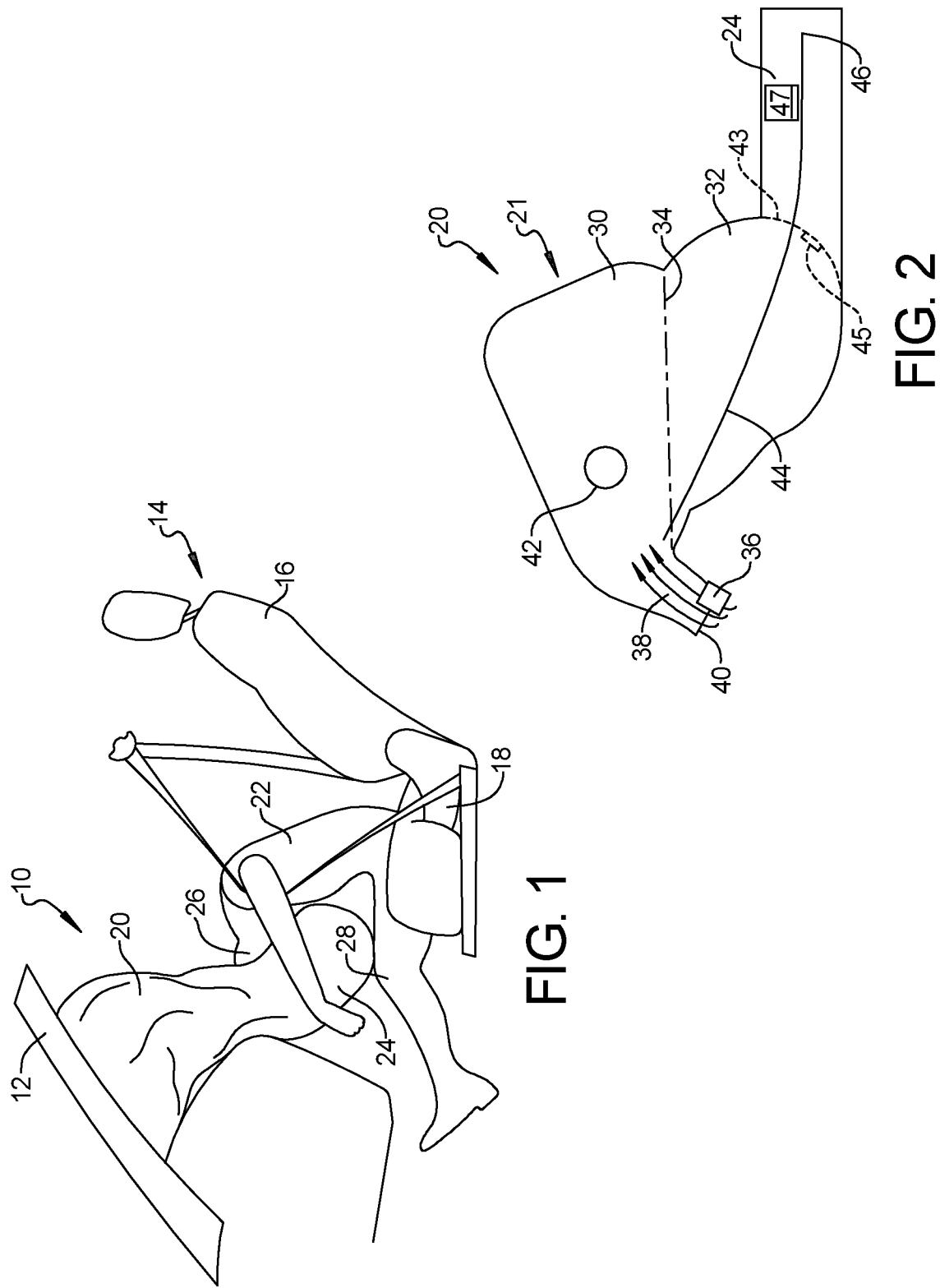

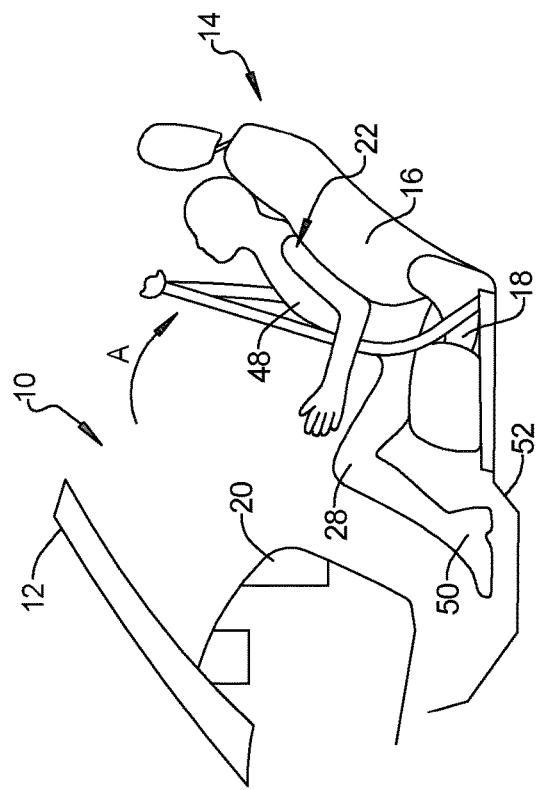
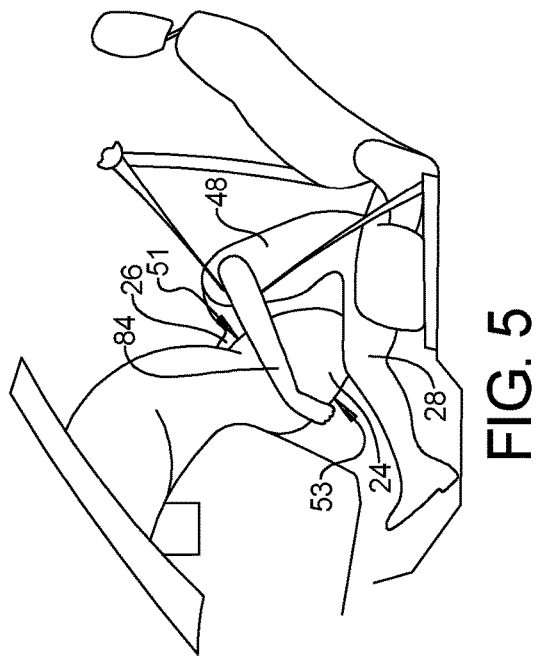
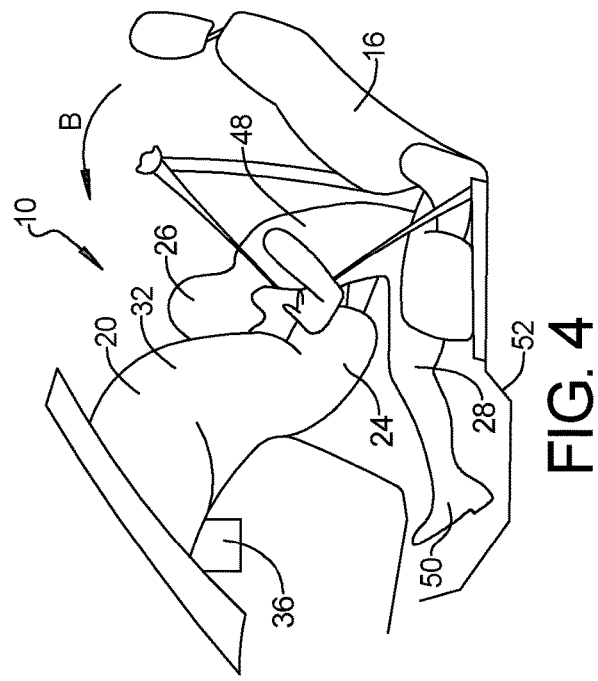

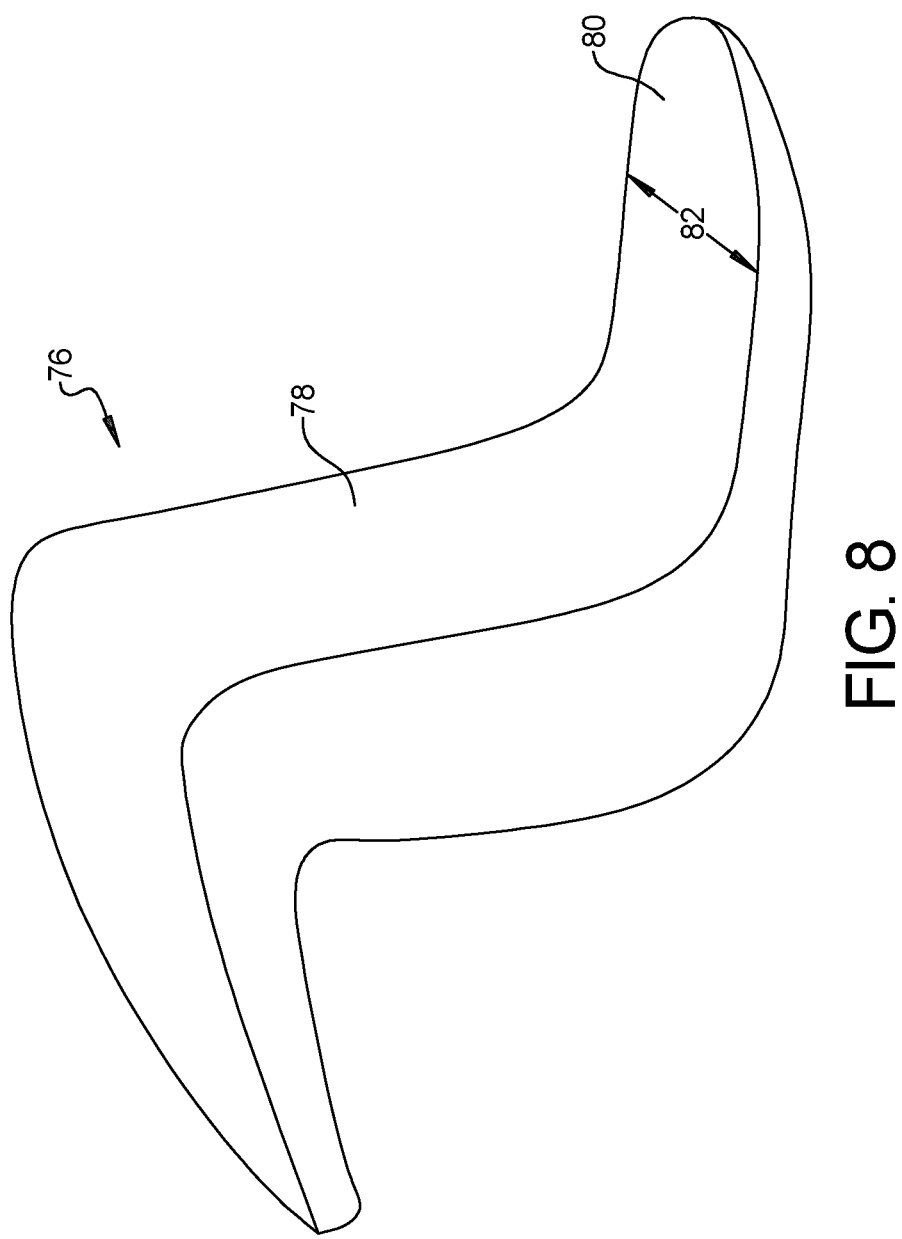

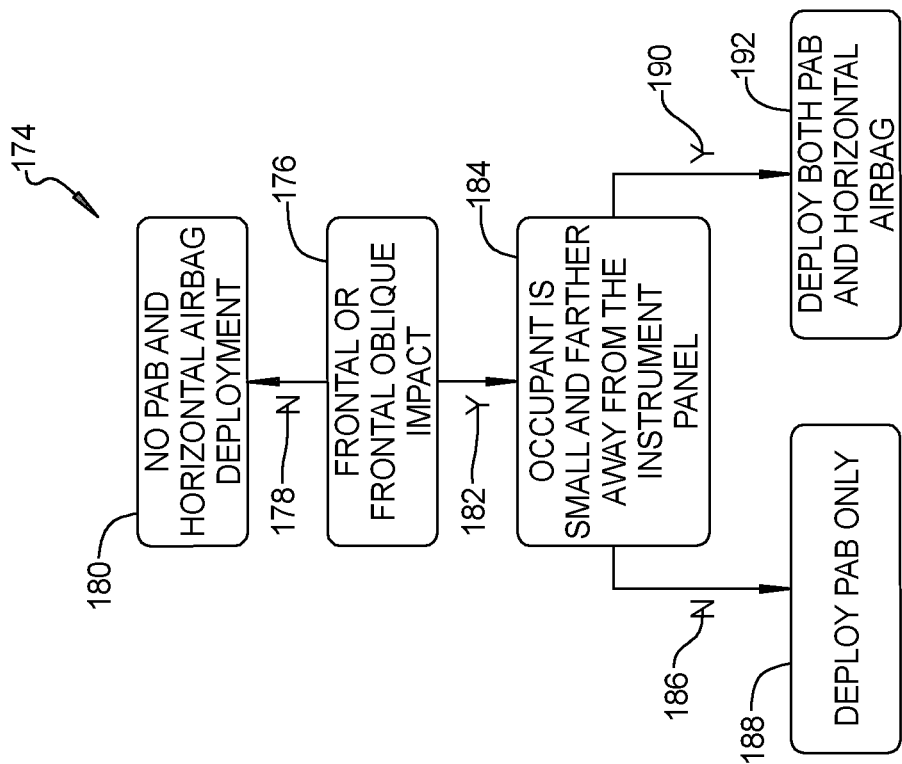
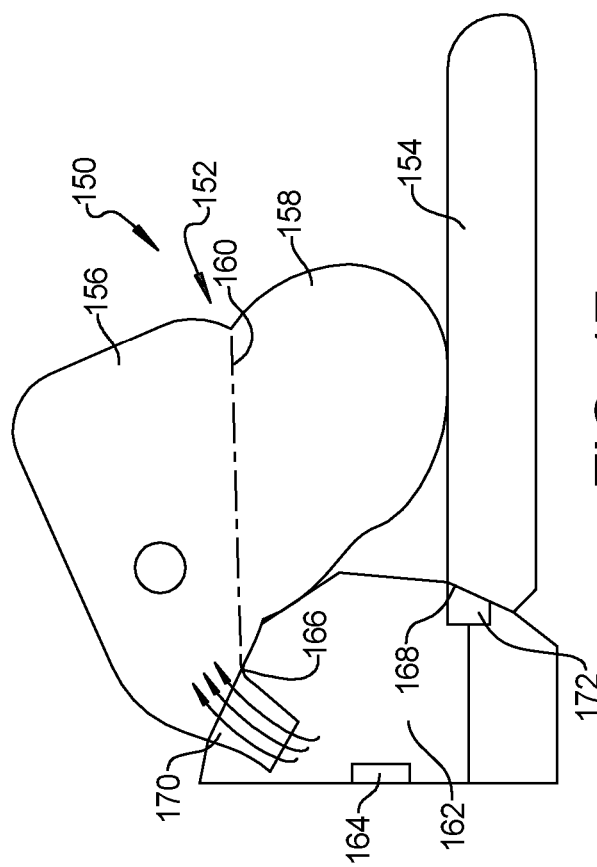
FIG. 17
FIG. 18

AIRBAG WITH EXTENDED HORIZONTAL CUSHION PREVENTING HEAD AND KNEE CONTACT

INTRODUCTION

The present disclosure relates to vehicle airbag systems.

Present vehicle passenger airbag designs extend toward the abdomen of an occupant or passenger upon initiation of an actuator. When the occupant is seated in a reclined position with the passenger positioned farther away from the airbag than when the passenger seat is in an upright position, present vehicle passenger airbag designs may allow contact between the head and knees of the passenger. The reclined position may not allow the airbag to interact properly with the passenger. A similar condition may also occur when the passenger is smaller than an average passenger size.

Thus, while current airbag systems and methods to control airbag systems achieve their intended purpose, there is a need for a new and improved airbag system and method to control an airbag system.

SUMMARY

According to several aspects, an airbag system includes a vehicle seat of a vehicle rotated between an upright position to a fully reclined position. An airbag is positioned forward of an occupant, hereinafter defining a passenger seated on the vehicle seat, the airbag positioned in a stowed condition and a fully inflated condition. A horizontal cushion of the airbag in the fully inflated condition extends from a main airbag section. The horizontal cushion is contacted by a head of the passenger and prevents rotation of the head into direct contact with one or both knees of the passenger.

In another aspect of the present disclosure, the main airbag section includes a first airbag portion and a second airbag portion with a dividing portion. The dividing portion separates the first airbag portion from the second airbag portion while allowing flow of a gas between the first airbag portion and the second airbag portion.

In another aspect of the present disclosure, the horizontal cushion is integrally and internally connected to the second airbag portion and commonly receives the gas together with the second airbag portion.

In another aspect of the present disclosure, the main airbag section as and the horizontal cushion are inflated upon initiation of an actuator which induces flow of the gas through a gas inlet passage directly into the first airbag portion, into the second airbag portion and into the horizontal cushion.

In another aspect of the present disclosure, an internal tether is fixed at one end proximate to the gas inlet passage and extends through the first airbag portion, the second airbag portion and the horizontal cushion. The internal tether is fixed within the horizontal cushion at a predetermined position to control an extending length of the horizontal cushion.

In another aspect of the present disclosure, the internal tether of the airbag is modified to extend or retract in length allowing a horizontal cushion length to be adjusted.

In another aspect of the present disclosure, a first fixed end of the internal tether is connected to an extension and retraction device positioned proximate to the gas inlet passage.

In another aspect of the present disclosure, a computer is in communication with the extension and retraction device and receives data including passenger size, seat position and passenger orientation prior to an airbag initiation event.

In another aspect of the present disclosure, a determination is made by the computer of a total length of the internal tether to achieve the predetermined position allowing a second end of the internal tether located at a free end of the horizontal cushion to achieve the horizontal cushion length.

In another aspect of the present disclosure, the internal tether defines an assembly of individual tethers.

According to several aspects, an airbag system includes a vehicle seat rotated between an upright position and a fully reclined position inclusive. An airbag faces toward a passenger seated on the vehicle seat. The airbag is positioned in a stowed condition and extended into a fully inflated condition. A horizontal cushion of the airbag in the fully inflated condition extends from a main airbag section. The horizontal cushion is contacted by a head of the passenger and prevents rotation of the head into direct contact with one or both knees of the passenger. An internal tether is used to control a shape of a surface of the horizontal cushion so that the head of the passenger is aligned with a center of the horizontal cushion.

In another aspect of the present disclosure, the internal tether defines an assembly of individual tethers.

In another aspect of the present disclosure, a first individual tether of the assembly of individual tethers shapes a first bolster of the horizontal cushion and a second individual tether of the assembly of individual tethers shapes a second bolster of the horizontal cushion at opposed sides of the horizontal cushion. The first bolster and the second bolster direct the head of the passenger toward a U-shaped center portion of the horizontal cushion.

In another aspect of the present disclosure, a first individual tether of the assembly of individual tethers shapes a first bolster of the horizontal cushion and a second individual tether of the assembly of individual tethers shapes a second bolster of the horizontal cushion at opposed sides of the horizontal cushion. The first bolster and the second bolster direct the head of the passenger toward a V-shaped center portion of the horizontal cushion.

In another aspect of the present disclosure, the internal include two longitudinal tethers within the horizontal cushion used to shape the horizontal cushion, having a first longitudinal tether positioned substantially in parallel with a second longitudinal tether. The first longitudinal tether and the second longitudinal tether direct the head of the passenger toward a center portion of the horizontal cushion between the first longitudinal tether and the second longitudinal tether.

In another aspect of the present disclosure, the main airbag section and the horizontal cushion are independently connected to and filled with a gas from a gas distribution chamber which is filled with the gas upon actuation of an actuator. A first gas inlet passage allows a first gas flow from the gas distribution chamber into the main airbag section. A second gas inlet passage directs a second gas flow from the gas distribution chamber into the horizontal cushion.

In another aspect of the present disclosure, a first control valve selectively opened or closed to allow or block the first gas flow from the gas distribution chamber into the main airbag section. A second control valve selectively opens or closes to allow or block the second gas flow from the gas distribution chamber into the horizontal cushion.

According to several aspects, a method to control deployment of a vehicle airbag, comprises: rotating a vehicle seat between an upright position and a fully reclined position inclusive; positioning an airbag facing toward a passenger seated on the vehicle seat in one of a stowed condition and a fully inflated condition; extending a horizontal cushion of the airbag in the fully inflated condition from a main airbag section; configuring the horizontal cushion to be contacted by a head of the passenger to prevent rotation of the head into direct contact with one or both knees of the passenger; and controlling a shape of a surface of the horizontal cushion using an internal tether so that the head of the passenger is aligned with a center of the horizontal cushion.

In another aspect of the present disclosure, the method further includes operating a computer in communication with the extension and retraction device and receiving data including passenger size, seat position and passenger orientation prior to an airbag initiation event.

In another aspect of the present disclosure, the method further includes determining using the computer a total length of the internal tether required to allow a second end of the internal tether located at a free end of the horizontal cushion to set a horizontal cushion length.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a side elevational view of an airbag system according to an exemplary aspect;

FIG. 2 is a side elevational view of an airbag of the system of FIG. 1 in a deployed condition;

FIG. 3 is a side elevational view of the airbag system of FIG. 1 prior to airbag deployment;

FIG. 4 is a side elevational view of the airbag system of FIG. 1 following airbag deployment and as a passenger makes initial contact with the airbag;

FIG. 5 is a side elevational view of the airbag system of FIG. 1 following airbag deployment and as the passenger makes reaches a final contact position with the airbag;

FIG. 8 is a top right perspective view of an airbag assembly of another aspect of the present disclosure in an airbag deployed condition;

FIG. 17 is a side elevational view of another aspect of an airbag assembly of the present disclosure in a deployed condition; and FIG. 18 is a system diagram of operational steps to control operation of the airbag system of FIG. 17.

DETAILED DESCRIPTION

Figure 7:
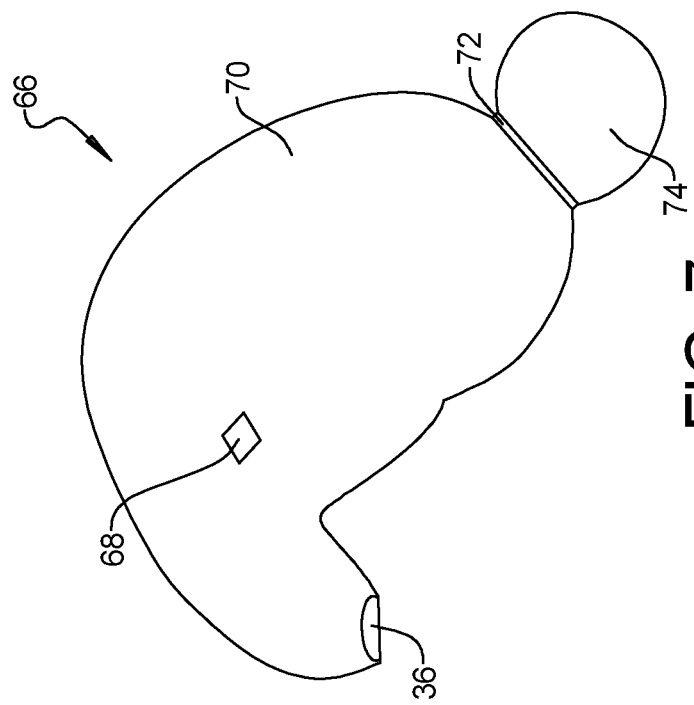
FIG. 7 is a side elevational view of an airbag assembly of another aspect of the present disclosure in an airbag deployed condition.

The following description is merely exemplary in nature and is not intended to limit the present disclosure, application, or uses.

Referring to FIG. 1, an airbag system 10 is provided in a vehicle 12 having a vehicle seat 14 which may define a passenger seat. The vehicle seat 14 includes a seat back 16 which rotates with respect to a seat base 18 between an upright position to a fully reclined position shown. A first airbag 20 defining a restraining device designed to inflate rapidly during an automobile collision is positioned forward of a passenger 22 in a fully inflated or fully deployed condition shown includes a horizontal cushion 24 contacted by a head 26 of the passenger 22 which prevents rotation of the head 26 into direct contact with one or both knees 28 of the passenger 22.

Referring to FIG. 2 and again to FIG. 1, the first airbag 20 in the fully deployed condition includes a main airbag section 21 having a first airbag portion 30 and a second airbag portion 32 with an airbag portion tether 34 shown in phantom for clarity separating the first airbag portion 30 from the second airbag portion 32 while allowing gas flow between the first airbag portion 30 and the second airbag portion 32 and controlling an inflated shape of the main airbag section 21. According to several aspects the horizontal cushion 24 is integrally and internally connected to the second airbag portion 32 and commonly receives inflation gas together with the second airbag portion 32. The main airbag section 21 as well as the horizontal cushion 24 are inflated upon initiation of an actuator 36 which induces flow of a gas 38 through a gas inlet passage 40 directly into the first airbag portion 30, the second airbag portion 32 and the horizontal cushion 24. An airbag vent 42 is provided to release the gas 38 to atmosphere at a controlled rate following full airbag inflation.

According to several aspects an extending internal tether 44 is fixed at one end proximate to the gas inlet passage 40 and extends through the first airbag portion 30, the second airbag portion 32 and the horizontal cushion 24. The internal tether 44 is fixed within the horizontal cushion 24 at a predetermined position 46 to control an extending length of the horizontal cushion 24 as discussed in greater detail with respect to FIG. 9.

According to several aspects, a dividing wall 43 may be positioned between the second airbag portion 32 and the horizontal cushion 24. To allow a controlled deflation rate of the horizontal cushion 24 different and slower than the a deflation rate of the main airbag section 21, a one-way inlet valve 45 may be positioned in the dividing wall 43 to permit a fill-flow-only into the horizontal cushion 24. A separate second airbag vent 47 may be installed in a wall of the horizontal cushion 24 whose flow rate is predetermined to control a deflation rate of the horizontal cushion 24, thereby allowing the horizontal cushion 24 to deflate slower than the main airbag section 21, to maximize the opportunity of the head 26 of the passenger 16 to fully contact the horizontal cushion 24.

Referring to FIG. 3, the fully reclined position of the vehicle seat 14 is depicted having the seat back 16 fully rotated in a rearward direction A with respect to the seat base 18. In the fully reclined position an abdomen 48 of the passenger 22 is in contact with the seat back 16, and feet 50 of the passenger 22 are in contact with a floor surface 52 of the vehicle 12. The first airbag 20 is in a stowed condition, such as in an instrument panel or a dashboard of the vehicle 12.

Referring to FIG. 4 and again to FIGS. 2 and 3, upon impact of the vehicle 12 with an object or during a rapid deceleration of the vehicle meeting a predetermined deceleration, an initiation of the actuator 36 occurs and the airbag 22 fully inflates, extending the first airbag portion 30, the second airbag portion 32 and the horizontal cushion 24 toward the passenger 22. At this time the abdomen 48 of the passenger 22 is rotating in a direction of rotation B toward the first airbag 20, until the head 26 of the passenger 22 initially contacts the second airbag portion 32. The feet 50 may lift upwardly away from contact with the floor surface 52 during this time period.

Referring to FIG. 5 and again to FIGS. 2 through 4, after contact of the head 26 of the passenger 22 with the fully inflated second airbag portion 32, further rotation of the abdomen 48 may occur until the head 26 contacts an upper face 51 of the horizontal cushion 24. The knees 28 may displace upward at this time until the knees 28 contact an opposite or lower face 53 of the horizontal cushion 24. The horizontal cushion 24 extended between the head 26 and the knees 28 precludes direct contact between the head 26 of the passenger 22 with the knees 28.

Referring to FIG. 6 and again to FIG. 2, according to several aspects a second airbag 54 includes multiple features of the first airbag 20, therefore only the differences will be further discussed. A main airbag section 56 includes a first airbag vent 58 and a second airbag vent 60 to decrease a deflation time for release of the gas 38 after the second airbag 54 is fully inflated as shown. A seam 62 extending horizontally may be provided between the main airbag section 56 and a horizontal cushion 64 to help define an inflated geometry of the horizontal cushion 64.

Figure 6:
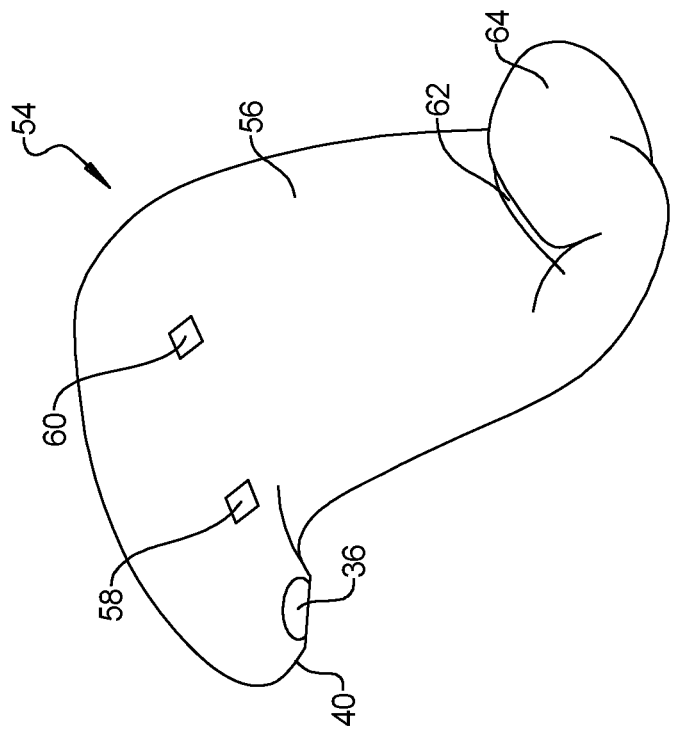
FIG. 6 is a top right perspective view of an airbag assembly of another aspect of the present disclosure in an airbag deployed condition.

Referring to FIG. 7 and again to FIGS. 2 and 6, according to several aspects a third airbag 66 includes multiple features of the first airbag 20 and the second airbag 54, therefore only the differences will be further discussed. A main airbag section 70 includes a single or first airbag vent 68 to decrease a deflation time for release of the gas 38 after the second airbag 54 is fully inflated as shown. A seam 72 extending horizontally may be provided between the main airbag section 70 and a horizontal cushion 74 which may be smaller than the horizontal cushion 64 to help define an inflated geometry of the horizontal cushion 74.

Referring to FIG. 8 and again to FIGS. 2, 3, 6 and 7, according to several aspects a fourth airbag 76 includes multiple features of the first airbag 20, the second airbag 54 and the third airbag 66, therefore only the differences will be further discussed. A main airbag section 78 is integrally connected to a horizontal cushion 80. According to several aspects, the horizontal cushion 80 has a width 82 which is narrower than a comparable width of the horizontal cushion 24, the horizontal cushion 64 and the horizontal cushion 74. The width 82 is predetermined to be less than a comparable spacing between arms 84 of the passenger 22, shown in FIG. 5, such that the horizontal cushion 80 will contact the abdomen 48 without interference from the arms 84.

Referring to FIG. 9 and again to FIGS. 2, 3 and 6 through 8, a front edge of the horizontal cushion 24 may need to be smaller and have a smooth edge such that the horizontal cushion 24 can fit into a space between the abdomen 48 of the passenger 22 and the passenger thighs or knees 28. According to several aspects the internal tether 44 of the first airbag 20 as well an internal tether installed in any of the second airbag 54, the third airbag 66 and the fourth airbag 76 may be modified to extend or retract in length allowing a horizontal cushion length 86 to be adjusted. Adjusting the horizontal cushion length 86 allows the airbag system 10 to accommodate passengers 22 of different heights, weights and sizes, and to account for passengers 22 seated in upright or reclined positions at the start of an airbag initiation event. To permit this, a first fixed end 88 of the internal tether 44 is connected to an extension and retraction device 90 positioned proximate to the gas inlet passage 40. The extension and retraction device 90 communicates with a computer 92 such as a processor which receives data including passenger size, seat position and passenger orientation prior to the airbag initiation event. A determination is made by the computer 92 of a total length of the internal tether 44 to achieve the predetermined position 46 allowing a second end 94 of the internal tether 44 at a free end 96 of the horizontal cushion 24 to achieve the desired horizontal cushion length 86. The internal tether 44 is applied to control whether to extend the horizontal cushion 24 and the horizontal cushion length 86 to extend the horizontal cushion 24 based on the passenger seating position and size as noted above. If the passenger 22 is seated farther away, then the horizontal cushion 24 is extended farther out accordingly.

Figure 9:
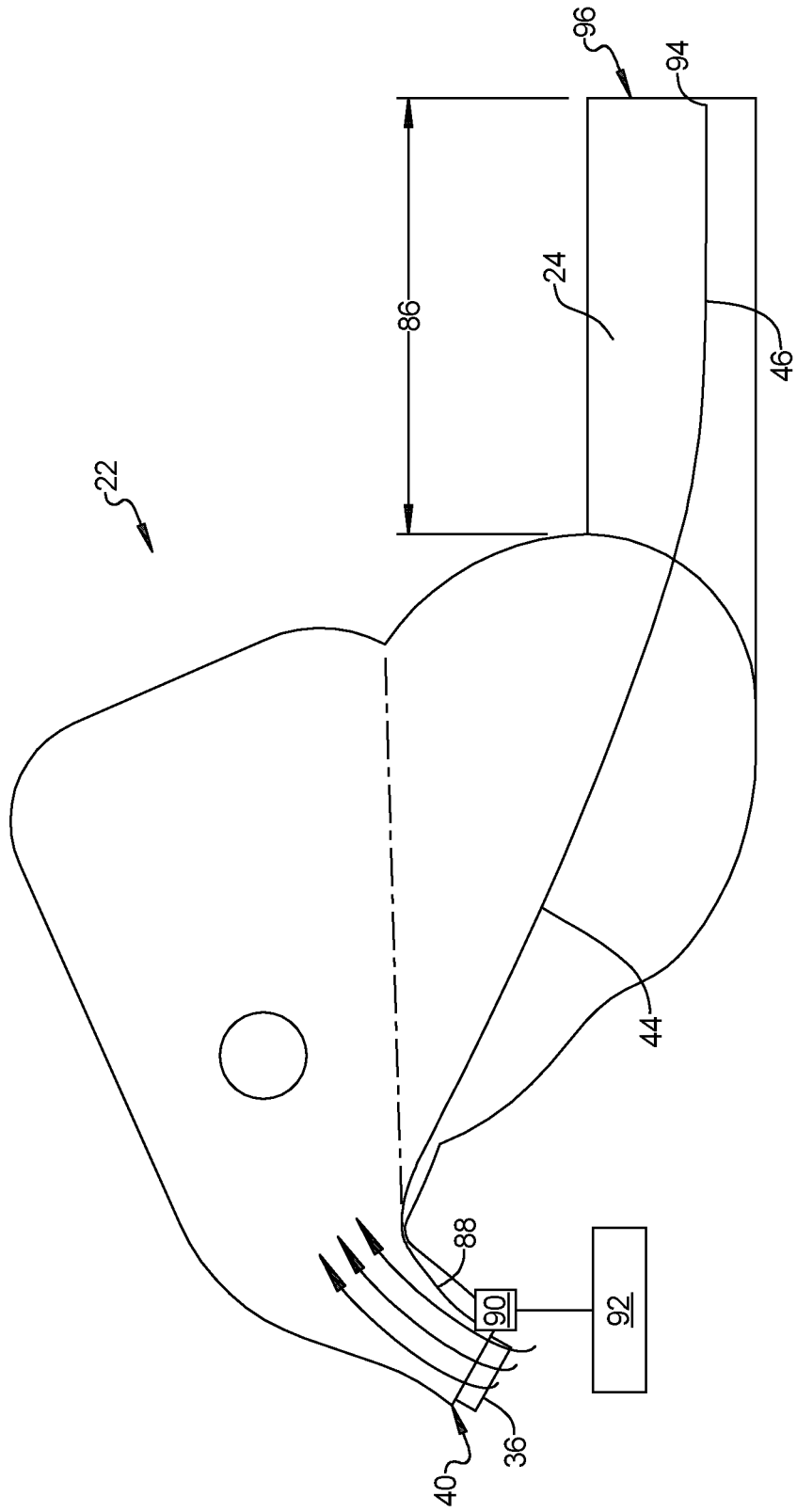
FIG. 9 is a side elevational view of the airbag assembly of FIG. 1 in a fully deployed condition modified to show an adjustable length horizontal cushion.

The computer 92 described in reference to FIG. 9 is a non-generalized, electronic control device having a preprogrammed digital controller or processor, memory or non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code.

Referring to FIG. 10 and again to FIGS. 1 through 2 and 6 through 9, according to several aspects a fifth airbag 98 includes multiple features of the first airbag 20, the second airbag 54, the third airbag 66 and the fourth airbag 76, therefore only the differences will be further discussed. According to several aspects, a horizontal cushion 100 includes an internal tether 102 used to ensure that the horizontal cushion 100 will bend during inflation and be directed horizontally and thereby prevent the horizontal cushion 100 from being directed downward and also thereby ensure that the passenger head 26 is aligned with a center of the horizontal cushion 100.

Figure 10:
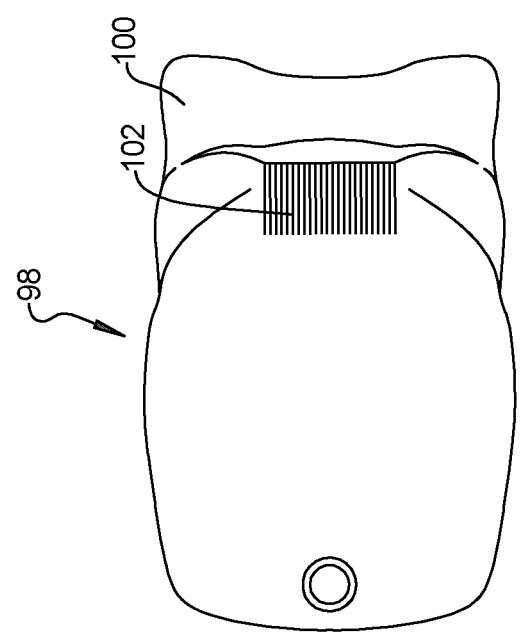
FIG. 10 is a top right plan view of an airbag assembly of another aspect of the present disclosure in an airbag deployed condition.

Referring to FIG. 11 and again to FIG. 10, the internal tether 102 may define an assembly 104 of tethers.

Figure 11:
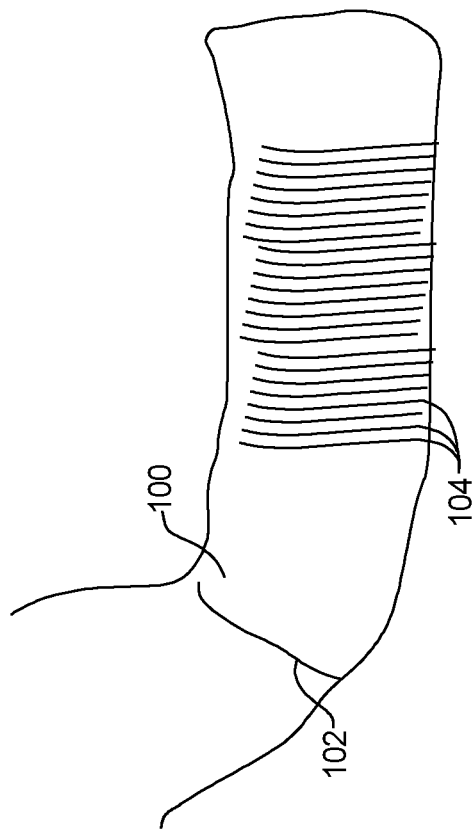
FIG. 11 is a side elevational view of the airbag assembly of FIG. 10 in an airbag deployed condition.
Figure 12:
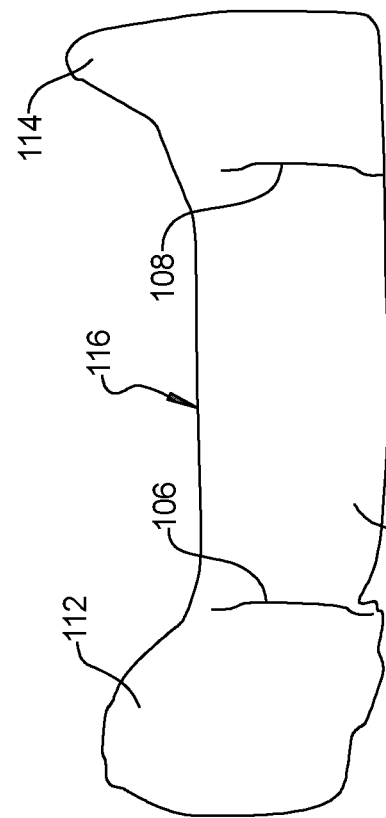
FIG. 12 is an end elevational view of the airbag assembly of FIG. 10 in an airbag deployed condition.

Referring to FIG. 12 and again to FIGS. 1, 10 and 11, a first individual tether 106 of the assembly 104 of tethers shapes a first bolster 112 and a second individual tether 108 of the assembly 104 of tethers shapes a second bolster 114 at sides of the horizontal cushion 100. The first bolster 112 and the second bolster 114 help to direct the head 26 of the passenger 22 toward a U-shaped center portion 116.

Figure 13:
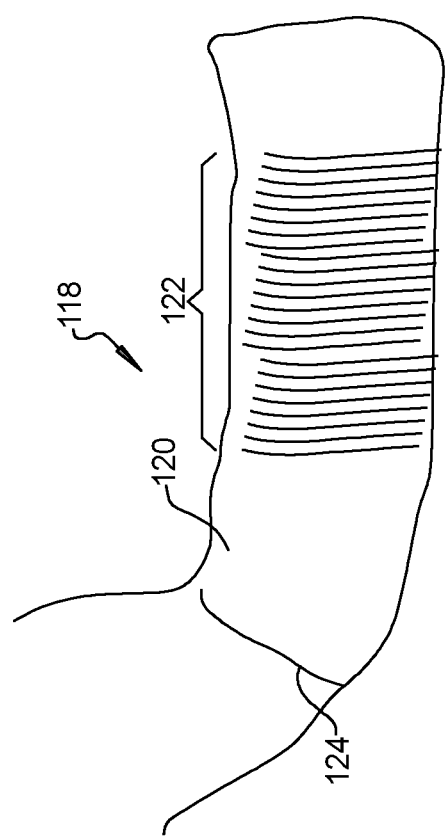
FIG. 13 is a side elevational view of another aspect of an airbag assembly of the present disclosure having a horizontal cushion in a deployed condition.

Referring to FIG. 13 and again to FIGS. 1 and 10 through 12, according to several aspects a sixth airbag 118 includes multiple features of the first airbag 20, the second airbag 54, the third airbag 66 and the fourth airbag 76, and the fifth airbag 98, therefore only the differences will be further discussed. According to several aspects, a horizontal cushion 120 and an internal tether defining an assembly of tethers 122 are used to control a shape of a surface of the horizontal cushion 120 so that the passenger head 26 is aligned with a center of the horizontal cushion 100. A first individual tether 124 may be provided similar to the tether 102 described in reference to FIG. 11 or an assembly of tethers 122 may be provided.

Figure 14:
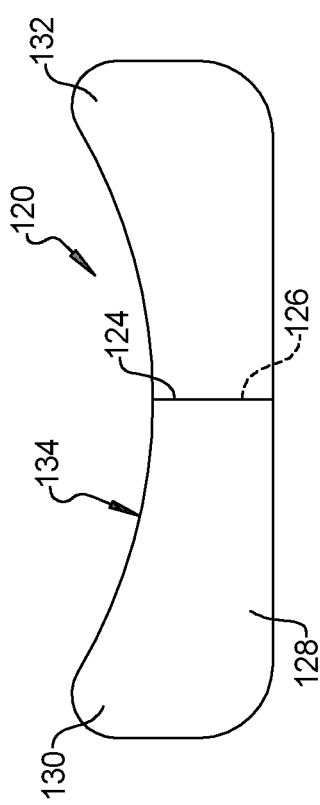
FIG. 14 is an end elevational view of the horizontal cushion of FIG. 13 in a deployed condition.

Referring to FIG. 14 and again to FIGS. 1 and 10 through 13, the first individual tether 124 is positioned proximate to a center 126 of the horizontal cushion 120. The first individual tether 124 shapes a first bolster 130 and a second bolster 132 at opposed sides of the horizontal cushion 120. The first bolster 130 and the second bolster 132 help to direct the head 26 of the passenger 22 toward a V-shaped center portion 134.

Figure 15:
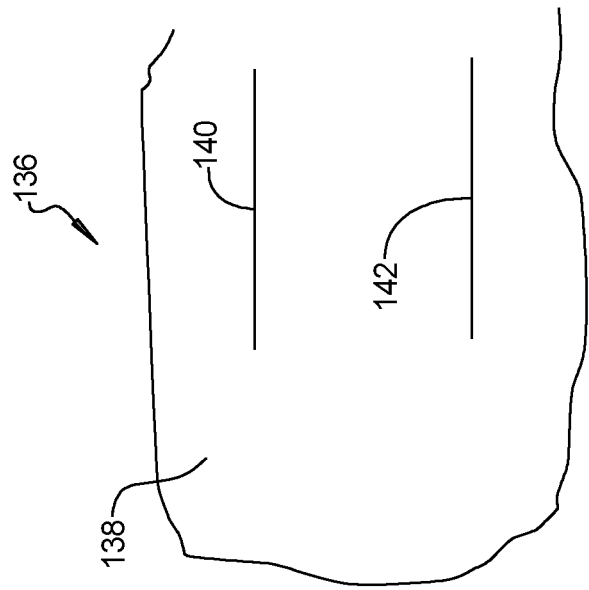
FIG. 15 is a front elevational view of a first airbag assembly of another aspect of the present disclosure in an airbag deployed condition.

Referring to FIG. 15 and again to FIGS. 1 and 10 through 14, according to several aspects a seventh airbag 136 includes multiple features of the first airbag 20, the second airbag 54, the third airbag 66, the fourth airbag 76, and the fifth airbag 98, therefore only the differences will be further discussed. According to several aspects, a vertical cushion 138 includes two internal tethers used to shape the vertical cushion 138. A first tether 140 is positioned substantially in parallel with a second tether 142. The first tether 140 and the second tether 142 help to direct the head 26 of the passenger 22 toward a center portion located between the first tether 140 and the second tether 142 and extending into a horizontal cushion not shown in this view.

Figure 16:
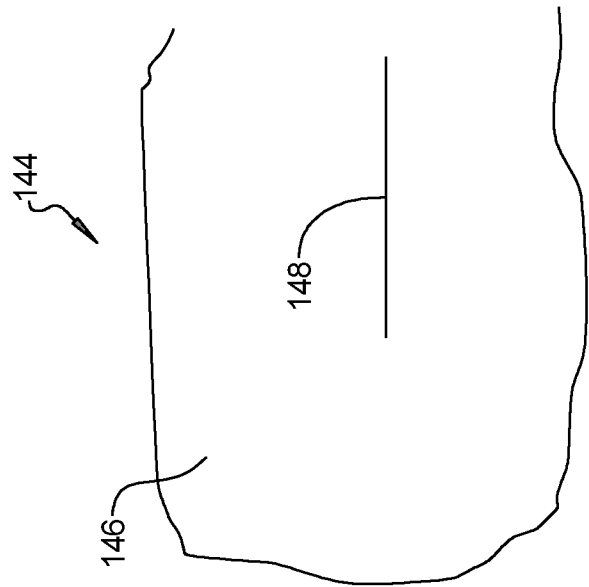
FIG. 16 is a front elevational view of a first airbag assembly of another aspect of the present disclosure in an airbag deployed condition.

Referring to FIG. 16 and again to FIGS. 1 and 10 through 15, according to several aspects an eighth airbag 144 includes multiple features of the first airbag 20, the second airbag 54, the third airbag 66, the fourth airbag 76, and the fifth airbag 98, therefore only the differences will be further discussed. According to several aspects, a vertical cushion 146 includes a single or a first tether 148 used to shape the vertical cushion 146. The first tether 148 is positioned substantially on a centerline of the vertical cushion 146. The first tether 148 helps to direct the head 26 of the passenger 22 toward a center portion shaped by the first tether 148 and extending into a horizontal cushion not shown in this view.

Referring to FIG. 17 and again to FIGS. 1 and 10 through 16, according to several aspects a ninth airbag 150 includes multiple features of the first airbag 20, the second airbag 54, the third airbag 66, the fourth airbag 76, and the fifth airbag 98, therefore only the differences will be further discussed. The ninth airbag 150 includes a main airbag section 152 which is independent of and separately gas filled with respect to a horizontal cushion 154 as described in greater detail below. The main airbag section 152 includes a first airbag portion 156 and a second airbag portion 158 with an airbag portion tether 160 shown in phantom separating the first airbag portion 156 from the second airbag portion 158 while allowing gas flow between the first airbag portion 156 and the second airbag portion 158 and controlling an inflated shape of the main airbag section 152.

The main airbag section 152 and the horizontal cushion 154 define two separate and distinct airbag chambers which are not connected together and are independently connected to and commonly gas filled from a single gas distribution chamber 162 which is itself gas filled upon actuation of a single actuator 164. A first gas inlet passage 166 allows gas flow from the gas distribution chamber 162 into the main airbag section 152. A second gas inlet passage 168 allows gas flow from the gas distribution chamber 162 into the horizontal cushion 154. According to several aspects, a first control valve 170 may be selectively opened or closed to allow or block gas flow from the gas distribution chamber 162 into the main airbag section 152. According to several aspects, a second control valve 172 may be selectively opened or closed to allow or block gas flow from the gas distribution chamber 162 into the horizontal cushion 154.

According to additional aspects, the first control valve 170 and the second control valve 172 may be replaced by separate actuators. This option also permits the main airbag section 152 and the horizontal cushion 154 to be independently inflated using predetermined criteria, as desired, without the need for control valves.

Referring to FIG. 18 and again to FIGS. 1 and 17, a system diagram 174 identifies decision and operation steps for operation of the ninth airbag 150 described in reference to FIG. 17. In a first identification step 176 a determination is made if the vehicle 12 has experienced a frontal impact or an oblique impact sufficient to energize the actuator 164. If a response to the first identification step 176 is NO 178, in a first decision step 180 no initiation signal is sent to the actuator 164 to deploy either the main airbag section 152 or the horizontal cushion 154. If a response to the first identification step 176 is YES 182, in a second decision step 184 a determination is made if the passenger 22 is smaller than a predetermined average passenger size and if the passenger is positioned away from an instrument panel or a dashboard of the vehicle 12 such as when the vehicle seat 14 is positioned in a reclined position. If a response to the second identification step 184 is NO 186, an initiation signal 188 is sent to open the first control valve 170 and to energize the actuator 164 to deploy the main airbag section 152. If a response to the second identification step 184 is YES 190, an initiation signal 192 is sent to open both the first control valve 170 and the second control valve 172 and to energize the actuator 164 to deploy both the main airbag section 152 and the horizontal cushion 154.

According to several aspects, the airbag system 10 of the present disclosure provides a passenger side airbag having an extended horizontal cushion or chamber above thighs of the passenger when deployed to further protect the passenger from head-to-knee contact when the passenger is positioned away from an instrumentation panel or a dashboard, or the passenger is positioned in a reclined position.

An airbag system 10 of the present disclosure offers several advantages. These include an airbag having an additional horizontal cushion to protect the passenger. A tether positioned inside the airbag creates or defines an airbag deployment shape.

What is claimed is:
1. An airbag system, comprising:
a vehicle seat of a vehicle rotated between an upright position to a fully reclined position;
an airbag configured to be positioned forward of a passenger seated on the vehicle seat, the airbag positioned in a stowed condition and a fully inflated condition; and a horizontal cushion of the airbag in the fully inflated condition extending from a main airbag section, the horizontal cushion configured to be contacted by a head of the passenger and preventing rotation of the head into direct contact with one or both knees of the passenger, wherein the main airbag section includes a first airbag portion and a second airbag portion with a dividing portion, the dividing portion separating the first airbag portion from the second airbag portion while allowing flow of a gas between the first airbag portion and the second airbag portion, wherein the horizontal cushion is integrally and internally connected to the second airbag portion and commonly receives the gas together with the second airbag portion, wherein the main airbag section and the horizontal cushion are inflated upon initiation of an actuator which induces flow of the gas through a gas inlet passage directly into the first airbag portion, into the second airbag portion and into the horizontal cushion, wherein an internal tether is fixed at a first fixed end proximate to the gas inlet passage and extends through the first airbag portion, the second airbag portion and the horizontal cushion, the internal tether being fixed within the horizontal cushion at a predetermined position to control an extending length of the horizontal cushion, and the internal tether is modified to extend or retract in length allowing a horizontal cushion length to be adjusted.

2. The airbag system of claim 1, wherein the first fixed end of the internal tether is connected to an extension and retraction device positioned proximate to the gas inlet passage.

3. The airbag system of claim 2, including a computer in communication with the extension and retraction device and receiving data including passenger size, seat position and passenger orientation prior to an airbag initiation event.

4. The airbag system of claim 3, wherein a determination is made by the computer of a total length of the internal tether to achieve the predetermined position allowing a second end of the internal tether located at a free end of the horizontal cushion to achieve the horizontal cushion length.

5. The airbag system of claim 1, wherein the internal tether defines an assembly of individual tethers.

6. The airbag system of claim 5, wherein a first individual tether of the assembly of individual tethers shapes a first bolster of the horizontal cushion and a second individual tether of the assembly of individual tethers shapes a second bolster of the horizontal cushion at opposed sides of the horizontal cushion, the first bolster and the second bolster configured to direct the head of the passenger toward a center portion of the horizontal cushion, wherein the center portion is U-shaped.

7. The airbag system of claim 5, wherein a first individual tether of the assembly of individual tethers shapes a first bolster of the horizontal cushion and a second individual tether of the assembly of individual tethers shapes a second bolster of the horizontal cushion at opposed sides of the horizontal cushion, the first bolster and the second bolster configured to direct the head of the passenger toward a center portion of the horizontal cushion, wherein the center portion is V-shaped.

8. The airbag system of claim 1, wherein the internal tether includes two longitudinal tethers within the horizontal cushion used to shape the horizontal cushion, having a first longitudinal tether positioned substantially in parallel with a second longitudinal tether, the first longitudinal tether and the second longitudinal tether configured to direct the head of the passenger toward a center portion of the horizontal cushion between the first longitudinal tether and the second longitudinal tether.

9. An airbag system, comprising:

a vehicle seat of a vehicle rotated between an upright position to a fully reclined position;

an airbag configured to be positioned forward of a passenger seated on the vehicle seat, the airbag positioned in a stowed condition and a fully inflated condition;

a horizontal cushion of the airbag in the fully inflated condition extending from a main airbag section, the horizontal cushion configured to be contacted by a head of the passenger and preventing rotation of the head into direct contact with one or both knees of the passenger, wherein the main airbag section includes a first airbag portion and a second airbag portion with a dividing portion, the dividing portion separating the first airbag portion from the second airbag portion while allowing flow of a gas between the first airbag portion and the second airbag portion;

a first gas inlet passage allows a first gas flow from a gas distribution chamber into the main airbag section; and a second gas inlet passage directs a second gas flow from the gas distribution chamber into the horizontal cushion, wherein the horizontal cushion is integrally and internally connected to the second airbag portion and commonly receives the gas together with the second airbag portion, wherein the main airbag section and the horizontal cushion are inflated upon initiation of an actuator which induces flow of the gas through the first gas inlet passage directly into the first airbag portion and the second airbag portion and which induces a flow of the gas through the second gas inlet passage into the horizontal cushion, wherein an internal tether is fixed at a first fixed end proximate to the first gas inlet passage and extends through the first airbag portion, the second airbag portion and the horizontal cushion, the internal tether being fixed within the horizontal cushion at a predetermined position to control an extending length of the horizontal cushion, and the internal tether is modified to extend or retract in length allowing a horizontal cushion length to be adjusted.

10. The airbag system of claim 9 further comprising:

a first control valve selectively opened or closed to allow or block a first gas flow from the gas distribution chamber into the main airbag section via the first gas inlet passage; and a second control valve selectively opened or closed to allow or block a second gas flow from the gas distribution chamber into the horizontal cushion via the second gas inlet passage.

\* \* \* \* \*